Patented Aug. 21, 1951

2,564,820

UNITED STATES PATENT OFFICE 2,564,820

MIXED BED SUGAR PURIFICATION

Pieter Smit, Amsterdam, Netherlands, assignor to N. V. Octrooien Maatschappij "Activit," Amsterdam, Netherlands No Drawing. Application December 26, 1947, Serial No. 794,106. In the Netherlands October 18, 1939

Section 1, Public Law 690, August 8, 1946
Patent expires October 18, 1959

4 Claims. (Cl. 127—46)

In addition to the existing methods of purification of sugar containing liquids obtained, e. g., from juices obtained by pressing or osmosis from stems, roots or fruits of plants, wherein often lime is used either in excess or not, which lime is afterwards removed with the aid of carbon dioxide or sulfur dioxide, the application of other means of purification has lately come into use, e. g., diatomaceous earth, activated carbon, colloidal humus-like substances, etc.

Nevertheless, the ideal of a good purification, viz., the removal of practically all substances that are not sugar, including inorganic and organic salts, etc., has by no means been attained.

In the sugar industry from sugar cane and beet, for instance, the juice, after an intensive purification, contains 7–10% so-called non-sugars in addition to 90–93% sucrose based on 100 parts of solid matter. It goes without saying how disadvantageous this is because: a. one can only free the liquid from the sugar by repeated crystallization; b. finally, a sugar-containing liquid, blackstrap molasses, remains which contains about 50% sugar which will not crystallize because the non-sugar substances prevent this, which, therefore, stays behind in this blackstrap molasses and is lost for human consumption or at most, is of value as cattle fodder.

According to the invention, the sugar-containing liquid is freed from its alkaline and acid substances by subjecting it to contact with substances of an acid or alkaline character respectively, which are practically insoluble under the conditions under which they are used and which also form practically insoluble salts. The fact, however, that they are of an acid or alkaline character, respectively, proves that free hydrogen and hydroxyl ions are present in the original substances and other ions in the salts that have been formed. Such substances, as is well known, also follow a well-known scientific principle, according to which a certain equilibrium occurs between the ions of substances and the ions of the medium in which these substances are present.

By this latter fact, I have a means of incorporating practically every desired ion into the substances. It is only necessary to bring it into a medium in which there is a surplus of those ions.

As has been turned out, according to the invention, a very broad meaning may be given to the alkaline and acid substances present in the liquid so that they not only comprise the perceptibly dissociated acids, bases and salts, but also substances, the acid and basic nature of which is scarcely noticeable or present in a latent form. This method at the same time provides a means of classifying the substances present in the extracts of plants. A surprising effect of the invention is, therefore, that the non-sugars present are removed to such a great extent.

This is especially apparent when one subjects blackstrap molasses to the treatment in which, as is known, all non-sugars are accumulated so that the percentage amounts to 30–40% of the weight of the dry substances. It is a fact that strong alkalis appear in this, about 20% $K_2O$ of the non-sugar weight, 2½% $Na_2O$ and a few per cent of the weaker inorganic bases, as well as 1%–2% of strong organic acids, but about 75% consists of weak organic acids and non-electrolytic organic substances, esters, albumins, decomposition products of albumins, etc. All these substances can for the greater part be removed in a simple way, according to this patent application, as will appear from the examples of execution given below. The surprising thing is also that the organic acids and bases, although they are so weakly dissociated, can be removed practically as easily as the strongly dissociated inorganic substances which have a much greater affinity for the solid substances, according to this patent application. One would expect that they could not be removed if these strongly dissociated inorganic substances were present, but, nevertheless, this is the case, while the capacity of the substances for the binding of the strongly dissociated inorganic substances is influenced by this to a very small degree. The binding of these substances must, therefore, probably be of a complicated nature, double binding and condensation phenomena undoubtedly occur.

In the process according to this application, the decolorization, especially with the treatment with the material that binds acid radicals, is enormous and to a higher degree than can be attained with any other decolorizing agent. For this reason, the invention is of very great technical importance because, practically, one could not yet dispose of decolorizing agents capable of removing such substances.

There are many substances of an acid or alkaline nature, respectively, which, under some conditions, are practically insoluble like their salts, and which may be taken into consideration for the use of the process according to this patent application.

Of the inorganic substances, the zeolites are known which can adsorb cations. They are, however, owing to their great solubility unsuitable especially at lower pH's. Those substances, however, which are particularly suitable are formed by the reaction of sulfuric acid and equivalent dehydrating agents on carbonaceous materials, e. g., pit coal. This may be made according to United States Patents Nos. 2,191,063, 2,191,059, and 2,191,060. These substances are resistant to the action of the strongest chemicals.

For the binding of the acid radicals, many of the so-called bases of Schiff have long been known, as well as other insoluble, resinous condensation products of an alkaline nature, provided they come up to the requirement named in this application, to wit, that they are practically insoluble when in use.

A very cheap substance, but often less active for the binding of the acid radicals, are the above-named reaction products of sulfuric acid and such on carbonaceous materials, sawdust, etc., which are a sort of humic acid and in which ammonia has been incorporated.

For the binding of the basic substances, synthetic resins are also known nowadays, as well as some insoluble organic acids, while for the binding of acid radicals, various natural nitrogeneous organic products, wool, etc., may be used.

Among the resins are the cation exchangers produced by the reaction of polyhydric phenols, sulfonated phenol on sulfonated naphthalene with formaldehyde, as well as those which are obtained by the reaction of sulfites or bisulfites with phenol-formaldehyde condensation products, and others. See United States Patents Nos. 2,104,501, 2,191,853, 2,228,159, 2,228,160, 2,204,539 etc. Anion exchangers of the synthetic resin type include the formaldehyde (alone or with acetone or other aldehydes) condensation products of aromatic polyamines, guanidine and its derivatives, alkylene polyamines, etc. alone or with other amino compounds. These may, for example, be prepared in accordance with United States Patents Nos. 2,151,883, 2,228,514, 2,259,169, 2,395,825, 2,251,234, 2,285,750, etc.

The process can be applied in various stages of the treatment of the extracts. Mostly, it is practical to proceed to the application immediately after the extraction so as to avoid the very expensive purifying methods otherwise used, e. g., in the sugar industry, working with a great excess of lime, which is afterwards precipitated with carbonic acid or sulfur dioxide. It is known that by this method many valuable substances are destroyed, vitamins, etc. According to the process, however, it is possible to separate these.

Technically, it is important that the blackstrap molasses, which is a waste product in many plants, as has been already explained in the beginning of the description, and is often gathered from the various plants, should be subjected to the process by which it is possible to crystallize for the greater part the sugar that is present in the blackstrap molasses. One can also sell this molasses as a palatable syrup for human consumption. This syrup is excellent because it has a low salt content and a fine aromatic taste.

It goes without saying that the method is also suitable for treatment of the extracts already purified, either before or after concentration. Thus, for example, the process may follow a defecation with lime and heat with or without other chemical treatment.

The application of the process, solely based upon the contact method, takes place in the simplest way by percolation over thick layers of the substances, which in this case have to be of granular structure. However, the treatment with powdery substances, which are afterwards filtered off, also gives satisfactory results, but this application may be more expensive.

Also, by applying granular substances, there is more opportunity of using the countercurrent principle in a simple way. The application of this principle always has advantages in case of equilibrium reactions with which one is dealing in this case.

One can first percolate the liquid to be treated over the substance that removes the alkaline substances, afterwards over the substances that remove the acid substances. As soon as important quantities of the substances to be removed break through one of the contact filters, it must be cut out. With the countercurrent principle, one can eventually treat more liquid if one applies not one filter of each sort consecutively, but more, thereby taking care that the liquid in turn passes a filter with an acid contact mass, one with an alkaline contact mass, one with an acid contact mass, and so on and so forth. Each filter in turn, namely the one that has been in contact with the untreated liquid, is prepared by means of treatment with a suitable electrolyte solution for a new purification of the liquid. After that this filter comes into contact with the liquid which has already passed through all the other filters.

The countercurrent principle is also applied if one uses one filter of each kind, but keeps this in use for a while after the break through and once more pumps the liquid that has passed after that over the contact mass after this has been regenerated.

This principle is also applied when the regerating liquid is carried through the contact mass in a direction opposite to that of the liquid to be purified. Whether it is of advantage to apply the counter-current principle depends on the price of the chemicals which are used for the regeneration and on whether the decline in neutralizing power of the contact mass takes place rapidly or slowly; in other words, whether the break through of the substances to be removed, once it has commenced, increases rapidly or slowly. In the latter case a more or less complete application of the countercurrent principle is of advantage.

In some cases one can apply a contact mass consisting of a mixture of the acid and alkaline substance, as when the regeneration of the substances can take place in the same manner or with chemicals which one of the substances regenerates without disturbing the power of the other ones.

As has already been mentioned, if the ion exchange substances are brought into a medium in which certain ions prevail, these ions are incorporated in the substance. On this principle both the removal of the substances from the liquids to be treated and the regeneration of the contact mass is based.

So, if one finally wishes to incorporate a certain base into the acid susbtance and a certain acid radical into the basic substance, one can apply a solution of a salt containing this base and acid as radicals. It is then practically only necessary to consider whether one of the substances is not affected, e. g., if the regeneration substance is too alkaline.

The chemicals that can serve for the regeneration, sulfuric acid, hydrochloric acid, sodium, carbonate, sodium hydroxide, principally come into consideration, are cheap, it is true, but must often be applied in great excess for which reason the solutions are often systematically repeatedly used. In sugar works, where one often has strongly alkaline condensates at disposal from the evaporating plant, this is a cheap regeneration liquid, especially for the alkaline contact mass.

It goes without saying that if one wants to collect the substances accumulated in the contact masses on account of their value, regenerating liquids of a suitable composition and concentration are applied. Strongly concentrated solutions are generally used so as not to obtain the liquids to be recovered in a too diluted condition.

An advantage of the process, according to this invention, which cannot be estimated too highly is that the liquid can mostly be filtered over the contact masses cold or at a moderate temperature. Decomposition losses of sugars and albumins fail to appear, while the colloids which hinder the filtration are, nevertheless, removed, and which in the old methods could only be rendered harmless by a radical treatment with heat and chemicals. Furthermore, the substances to be recovered from the contact masses are not decomposed nor coagulated.

Some examples are given below:

*Example 1*

Beet molasses with a sugar content of 51%, water content of 18%, ash content of 9.8% is diluted with a sugar-containing liquid to 65 Brix, while the pH is 7.9.

This liquid is treated with 5% of an active humus made of sawdust with the aid of sulfuric acid, adjusted at 80° C. and filtered, on account of which the pH decreases to 6.3 and the Brix to 60.

This liquid is successively filtered over a contact mass of a substance obtained by the reaction below 100° C. of gaseous SO₃ on pit coal and a contact mass of a synthetic resin obtained by the reaction of an aldehyde on an aromatic amine, such as a m-phenylene diamine-formaldehyde condensation product.

The acid contact mass has a size of grain of 0.25–1 mm. and is contained in an iron tank covered by ebonite of 6000 liters net contents and contains 2900 kg. of the substance. The alkaline contact mass with the same size of grain is contained in an iron tank covered with ebonite of 7500 liters net contents and contains 2500 kg. of the substance. The substances are placed on supporting layers of sand. Both tanks are filled with water up to the surface of the mass, and an efficient overflow pipe prevents the masses from getting dry.

Over both masses, 2500 liters of water containing 320 kg. of hydrochloric acid and 3750 liters of water, respectively, containing 350 kg. of caustic soda are passed downwards therethrough, and after that 4000 liters and 8000 liters of water, respectively.

After that, 4000 liters of the diluted blackstrap molasses are passed through the acid substance, then 3000 liters of water and finally the regenerating liquid and the rinse water.

The liquid coming out of the filter is first water, but until a concentration of 3 Brix is obtained, the effluent is discarded after which one collects separately, consecutively:

1000 liters of liquid, concentration 10.2 Brix
1000 liters of liquid, concentration 25.1 Brix
1000 liters of liquid, concentration 40.4 Brix
1000 liters of liquid, concentration 39.2 Brix
1000 liters of liquid, concentration 35.0 Brix
1000 liters of liquid, concentration 29.2 Brix
1000 liters of liquid, concentration 22.2 Brix
1000 liters of liquid, concentration 14.1 Brix
1000 liters of liquid, concentration 7.3 Brix
1000 liters of liquid, concentration 4.0 Brix The liquid coming after this is discarded again.

The sugar solutions collected are successively carried over the alkaline contact mass, then 3000 liters of water and finally also the regenerating liquid and the rinse water.

The liquid coming out of the filter is first water, and again, one does not collect the liquid until it has a concentration of 3 Brix, when the following are collected:

1000 liters of liquid, concentration 5.0 Brix
1000 liters of liquid, concentration 10.4 Brix
1000 liters of liquid, concentration 18.9 Brix
1000 liters of liquid, concentration 25.4 Brix
1000 liters of liquid, concentration 28.3 Brix
1000 liters of liquid, concentration 27.4 Brix
1000 liters of liquid, concentration 25.6 Brix
1000 liters of liquid, concentration 20.0 Brix
1000 liters of liquid, concentration 13.4 Brix
1000 liters of liquid, concentration 7.6 Brix
1000 liters of liquid, concentration 4.0 Brix The liquid coming after this is discarded again.

The pH of the liquid that has passed the acid mass has considerably decreased to about 2.8, that of the liquid that has passed the alkaline mass is normal again and nearly neutral to phenolphthalein, only the last effluent sugar solution again showed a low pH.

About 87% of the solid substance introduced passes the acid contact mass, about 72% the alkaline contact mass. This last filtrate is in no way inferior to purified thick juice in color, purity and crystallization power.

The largest color removal is accomplished by the alkaline contact mass, since after leaving this mass, the liquid contains only about 15% of the original coloring matter, while after leaving the acid contact mass, it contains about 85%.

In the practical operation of the process, the dilute effluent which first comes from the filters and the diluted effluent which comes last may be used for diluting the original blackstrap molasses.

In the regenerating liquid of the acid contact mass, all potassium is accumulated; in that of the alkaline mass, all organic acids and other organic substances. These liquids can be processed to recover these products.

The alkaline contact mass is often apt to disperse at first and to give off color. In this case, it is desirable to pass the diluted effluent from the alkaline mass over the acid mass as a result of which this dispersion is separated.

Not only may potassium be recovered from the acid contact mass (the cation exchanger), but also organic bases, such as betaine, while, among the organic acids, glutamic acid may be recovered from the alkaline mass (the anion exchanger). This is done, of course, by treating the contact masses with regenerating solutions so that the substances desired are recovered in the spent regenerants in the form of salts and may, of course, be converted into free bases and free acids.

Example 2

The acid and alkaline contact mass can be mixed or placed one on the other in layers in a tank of 13,500 liters net contents and the same quantity of the blackstrap molasses can be passed through this after having been diluted according to Example 1. The regeneration can take place with 600 kg. of sulfuric acid. The process is greatly simplified by this, although the removal of non-sugar substances, especially of color, takes place to a considerably less extent. The liquid is finally strongly acid by this sulfuric acid, which must be precipitated and filtered off with barite. If one uses an acid contact mass proof against lye, one can also regenerate with a solution of lye or soda.

Example 3

The regeneration of the alkaline contact mass (the cation exchanger) from Example 1 is effected by passing water containing sulfur dioxide through it. As soon as the effluent water is almost free from the impurities being removed from the contact mass, it is steamed out and if desired, the free sulfur dioxide thus liberated may be collected.

Example 4

In Example 3 hot water is used for rinsing purposes until the effluent water contains practically none of the impurities being removed from the contact mass. Then the contact mass is sterilized by steaming out.

Example 5

In Example 4 water saturated with lime is used, and this is rinsed out with water as soon as there are practically none of the impurities being removed from the contact mass in the effluent liquid.

Example 6

Through the same apparatus as applied according to Example 1 unheated diffusion juice, obtained from beets or press juice from sugar cane, may be passed.

The regeneration can take place in the same way. Pectins, etc., can be obtained from the regenerating liquid.

It is desirable to sterilize the filters from time to time, e. g., by steaming or boiling out with hot water.

Example 7

In the manner of Example 1 clarified refinery syrups can be treated, especially with a view to the decolorization to replace the treatment with bone char. The decolorizing expenses are considerably less.

Example 8

A synthetic resin is made from aniline and formaldehyde in the following manner: 28 liters of aniline, 40 liters of water and 25 liters of hydrochloric acid (specific gravity 1.19) are mixed and the resulting mixture is cooled to about 25° C. 10 liters of a 40% aqueous solution of formaldehyde are added, and the mixture is cooled again, after which another 10 liters of the aqueous solution of formaldehyde are added rapidly and mixed in a few seconds.

It may be practical to drain off the liquid in normal 10 liter pails after the first addition of the formaldehyde solution, and to divide and mix the second portion of the formaldehyde solution in these pails.

The solidified mass can be ground to particles of 0.2–0.5 mm. after cooling and must immediately be put into a 20% solution of caustic soda for hardening purposes, during which process the resin changes from red to white and becomes very hard. The product is now suitable for binding acid after leaching with water to remove the excess caustic soda solution.

The resin prepared above is put in a cylindrical tank, in the bottom of which is a layer of sand, so that the liquid can percolate through the mass. A cylindrical tank put up beside this contains a substance having cation-exchanging properties which is obtained by the reaction of strong sulfuric acid on pit coal. The resin is regenerated with a solution of sodium carbonate and the cation-exchanging material with a solution of hydrochloric acid by passing these liquids through the respective substances.

After that, a diluted solution of Cuba blackstrap molasses of 60 Brix is passed successively through the cation and anion binding substance. This solution of molasses was freed beforehand from colloids by adding lime and then carbonic acid and a colloid containing carbon, obtained by the reaction of sulfuric acid on sawdust. As a result of this treatment, the non-sugar content on solid matter decreased from 40% of the initial blackstrap to 15%. The treatment of the molasses gave about 70% decolorization. Per kilogram of solid matter, 1 kilogram of the cation exchanger and 1.5 kilograms of the anion-exchanging resin were used.

After leaching, steaming and treating with the regenerating liquids, the masses were reactivated and could be used again with the same results. The acid consumption is 10% and the alkali consumption is 15% in excess of the theoretical quantities required. The salts of the blackstrap can be simply recovered by my process.

Example 9

A solution of washed raw sugar is percolated successively over the contact masses in the same way as the molasses in Example 8. Twenty times as much liquid can now be treated before regeneration is required, while about four times as great an improvement in purity is obtained as with the customary bone char treatment and the decolorization is equal.

Example 10

An anion-exchanging mass is prepared as follows: 130 liters of m-phenylene diamine hydrochloride are mixed with 300 liters of water and then 50 liters of 40% formaldehyde solution are added slowly and mixed while cooling rapidly. After cooling to 10° C., the mass is drained into pails and 70 liters of 40% formaldehyde solution are added and proportionately distributed among the pails. This is mixed quickly with the contents of the pails, and then the product is finished up as in Example 8.

If one uses the above resin in the process of Example 9, one has to use only about 0.8 as much resin in order to get the same increase in purity as in Example 9. For equal decolorization, however, 1.2 times as much resin must be used.

In Examples 8–10 the proportion for the anion exchanger prepared according to Example 8 is more favorable compared with that prepared according to Example 10, if one does not allow the anion exchanger to proceed further than pH 4, and if care is taken that the cation exchange substance does not go below pH 2.

Example 11

The solution treated according to Example 9 is treated with the resin prepared according to Example 8 in a powdery state. The decolorization obtained in this way is better than the one obtained with the same quantity of active carbon of first-class quality.

While in many cases my process is of greatest utility when applied to raw or untreated sugar juices, nevertheless, it may also be applied to clarified or defecated juices or syrups containing sugar, as illustrated in Examples 1, 8 and 7. Thus, molasses may be clarified and treated in accordance with my invention. The treatment of either the raw juices, clarified juices or clarified syrups may be carried out with one pair of acid and alkaline contact masses or else a plurality of pairs may be used in series. Furthermore, an anion exchanger (alkaline contact mass) may be used prior to treatment with a pair of contact materials including a cation exchanger (acid contact mass) and an anion exchanger (alkaline contact mass).

It is possible to remove the acid from strongly acidified sugar solutions, for example, those obtained by the conversion of flour by means of acid by treatment with an anion exchanger and then with an organic cation exchanger. The treatment with the latter needs to take place to a very small extent. In glucose manufacture, generally, excellent results are obtained if the converted juice is first treated with an alkaline contact mass (anion exchanger) and thereafter with an acid contact mass (cation exchanger).

Sulfur dioxide is also very suitable as a regenerating agent especially for the alkaline contact mass (anion exchanger). When the sulfur dioxide is used in excess, it drives out the impurities absorbed on the resin, and then may itself be driven out of the alkaline contact mass by steaming or heating.

For the regeneration of the cation exchanger, a treatment with acid is best, as applicant has found. A modification of this process is the use of sulfur dioxide, which has sterilizing properties, and which besides by washing can also be removed in a simple way by steaming or heating.

For the regeneration of the anion exchanger, this regeneration method with sulfurous acid is extremely suitable, and may be used in excess because it may be easily recovered from the liquid by heating it, and consequently, all substances adsorbed can be driven out of the mass to be regenerated.

When regenerating the alkaline contact mass according to the present methods, a good result may be obtained if much water is available by washing the mass to be regenerated for a long time. The absorbed impurities are thus carried away. The process can be accelerated if hot water is used.

If an alkali treatment for the regeneration of the alkaline contact mass is applied, a diluted lime solution is better and cheaper than a solution of soda or caustic soda.

It may be that in the long run the contact masses accumulate substances which are not removed by the aforementioned regenerating methods. In this case, a treatment of the alkaline contact mass (the anion exchanger) with strong solutions of caustic soda and of strong sulfuric acid to which oxidation agents may be added is advisable. The acidic contact mass (the cation exchanger) is treated preferably with sulfuric acid, but may in some cases desirably be treated first with a caustic soda solution.

The term "alkaline contact mass" is used herein to denote those positive polar substances which contain alkaline groups and which, therefore, are sometimes called "acid-binding substances." They may also be called "anion exchangers" and "acid absorption resins" or "acid adsorption resins."

The term "acid contact mass" is used herein to denote those negative polar substances which contain acidic groups and which may also be called "cation exchangers." Since they are organic, they are sometimes called "carbonaceous zeolites." Furthermore, since they are used in the form where they have free acid groups, they may be said to be hydrogen activated, and in this form, they are often referred to as "hydrogen zeolites" or "hydrogen exchangers."

This application is a continuation-in-part of my copending application Serial No. 359,575, filed October 3, 1940, now abandoned.

I claim:

1. A process which comprises contacting an impure aqueous sugar solution with a mixture of two chemically different materials, one of which is an organic cation exchanger and the other of which is an organic anion exchanger, said exchangers being water-insoluble.

2. A process as in claim 1 wherein the sugar solution is a raw sugar juice.

3. A process as in claim 1 wherein the sugar solution is a clarified sugar solution.

4. A process for the purification of an impure aqueous sugar solution which comprises agitating said solution with a mixture of two chemically different materials, one of which is an organic cation exchanger and the other of which is an organic anion exchanger, said exchangers being water-insoluble and in powdered form.

PIETER SMIT.

REFERENCES CITED

The following references are of record in the file of this patent:

UNITED STATES PATENTS

| Number | Name | Date |
|---|---|---|
| 2,191,365 | Boyd | Feb. 20, 1940 |
| 2,275,210 | Urbain et al. | Mar. 3, 1942 |
| 2,341,907 | Cheetham | Feb. 15, 1944 |
| 2,372,233 | Thurston | Mar. 27, 1945 |
| 2,388,194 | Vallez | Oct. 30, 1945 |

FOREIGN PATENTS

| Number | Country | Date |
|---|---|---|
| 509,710 | Great Britain | July 19, 1939 |

OTHER REFERENCES

Serial No. 359,575, Smit (A. P. C.), published May 11, 1943.